June 10, 1941.  R. R. CHAPPELL ET AL  2,245,461
POSITION REPRODUCING MEANS
Filed May 20, 1939   3 Sheets-Sheet 2
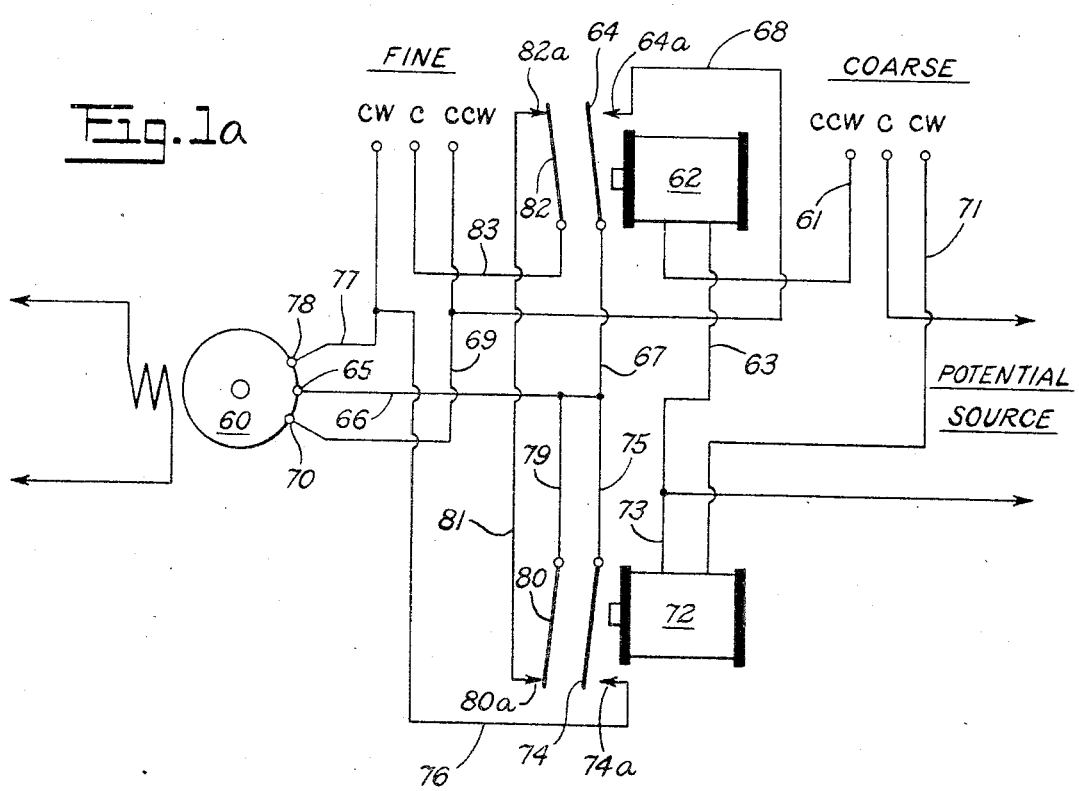
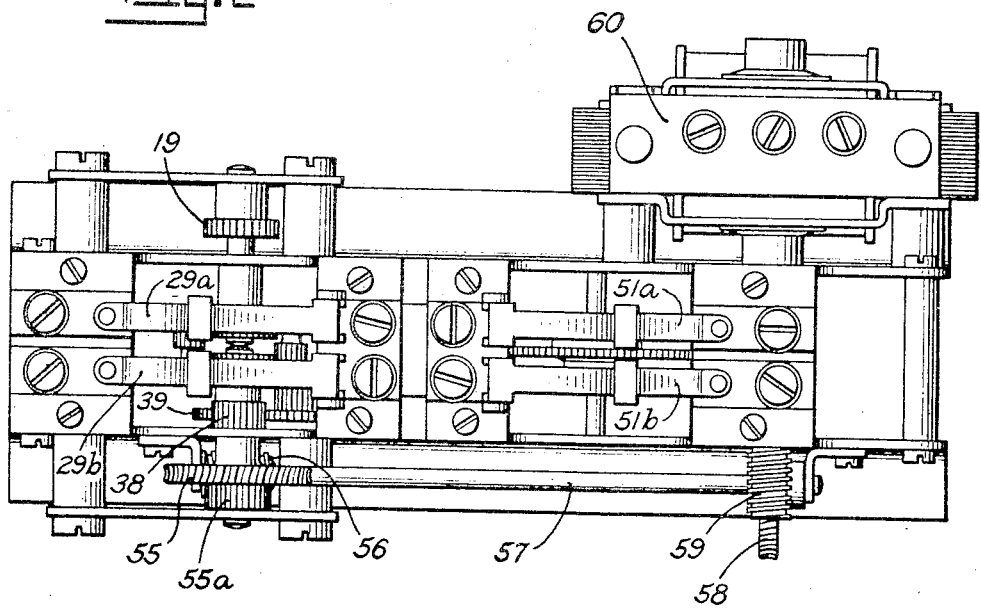
INVENTORS.
Ralph R. Chappell
Rutger B. Colt
BY Stephen Cerstvik
ATTORNEY.

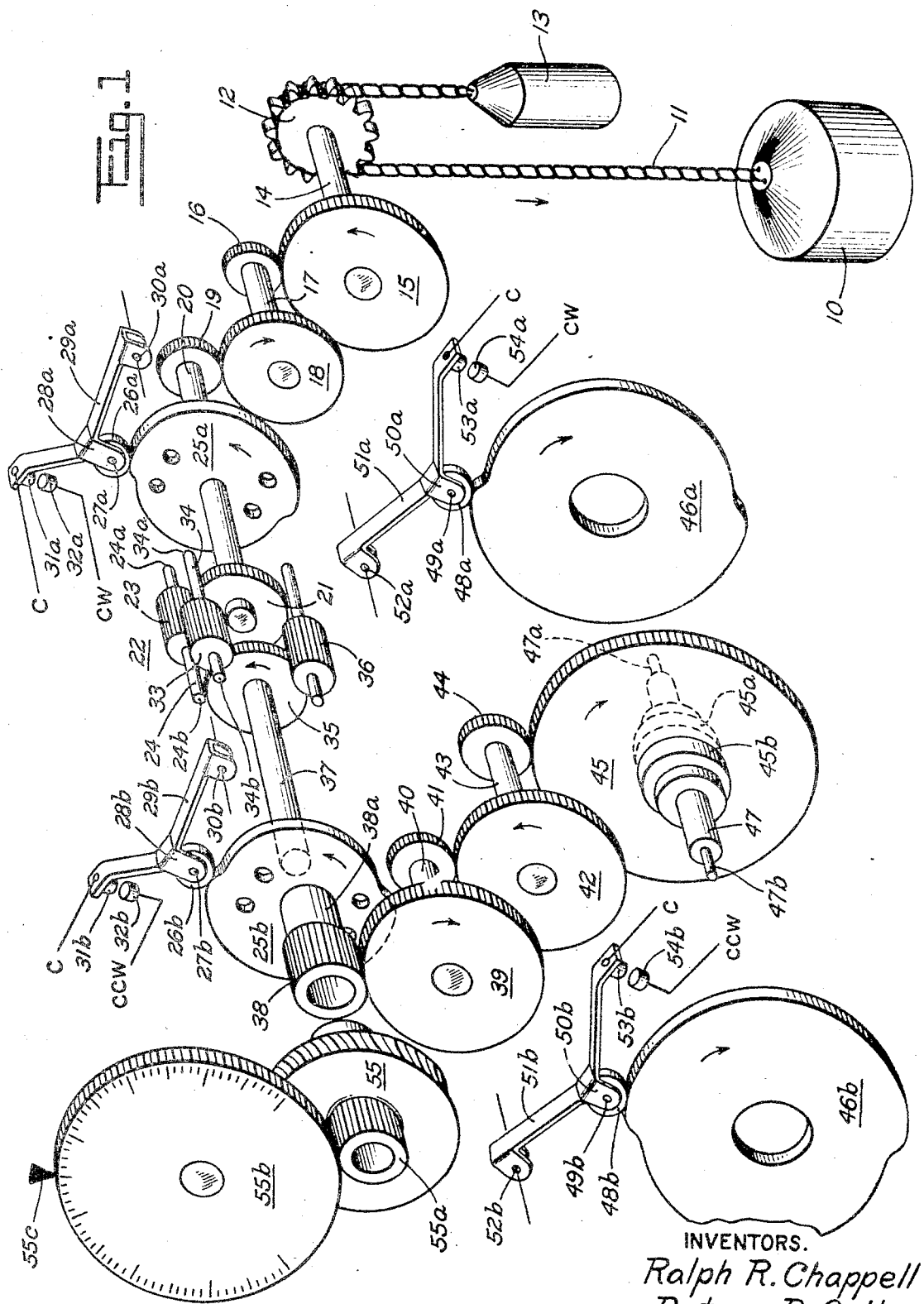

INVENTORS.
Ralph R. Chappell
Rutger B. Colt
BY Stephen Cerstvik
ATTORNEY.

Patented June 10, 1941

2,245,461

UNITED STATES PATENT OFFICE 2,245,461

POSITION REPRODUCING MEANS

Ralph R. Chappell, Richmond, Va., and Rutger B. Colt, Baltimore, Md., assignors to Bendix Aviation Corporation, South Bend, Ind., a corporation of Delaware Application May 20, 1939, Serial No. 274,856

4 Claims. (Cl. 172—239)

The present invention relates to position reproducing means and more particularly to resynchronizing mechanism utilized with means for reproducing at one point the changes in position of an object or changes in value of a physical quantity at another point.

The invention embodies novel means for storing movement or changes, in proportion to movement of an object or changes of value of a physical quantity during certain periods whereby indications or records of said movement or change may be made during following periods.

More specifically, the device embodying the invention is provided for the purpose of storing in a system, movement or values proportional to changes in value of a physical quantity during power or transmission interruption whereby, upon cessation of said interruption, an indication or recordation is remotely reproduced and all parts of the system are returned to synchronism.

Similar devices of the prior art have been utilized but these have comprised complex and expensive electrical systems requiring great precision of construction and duplication of high precision parts. Therefore, one of the objects of the present invention is to provide a novel system comprising simple mechanical means cooperating with simple, electrical means whereby resynchronization between parts and the reproduction of position is greatly simplified.

Another object is to provide differential means for storing movement or changes in proportion to movement of an object or changes in value of a physical quantity, combined with means whereby said movement or change is delivered at varying rates until synchronism between the various parts of the system is achieved.

A further object is to provide means for differentially and mechanically retarding delivery of a force, and means cooperating with said differential means for gradually transmitting portions of said force until an indication or recordation proportional to said retarded force is reproduced.

Still another object is to provide differential means for storing movement proportional to the value of a physical quantity to be measured at one point, and means cooperating with said differential means for reproducing at another point, an indication or recordation proportional to the value of said physical quantity.

A further object is to provide novel differentially operated means for storing, during one interval of time, movement proportional to the value of a physical quantity to be measured, means interconnected with said first means for producing a storage of said movement at a different ratio of proportionality, and means whereby an indication or recordation is reproduced during another interval, said recordation being produced by said first storage at one rate and by said second storage at a different rate, whereby rapidity of operation and precision of reproduction are obtained.

Still another object is to provide a differential gear mechanism for actuating control means for an electrical circuit in proportion to changes in value of a physical quantity, means for producing at a different ratio of proportionality actuation of another electrical control circuit by said same changes, and selecting means cooperating with said actuating means, whereby control of an electrical circuit by said control means is sequentially obtained.

The above and further objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention, reference being primarily had for this purpose to the appended claims.

In the drawings, wherein like reference characters refer to like parts throughout the several views;

Fig. 1 is an exploded perspective view illustrating the mechanical differential storing device;

Fig. 1a is a schematic illustration of the electrical circuits controlled by the storing device of Fig. 1;

Fig. 2 is a plan view of the storing device of Fig. 1, including the control motor, illustrating the various elements of said device in assembled position;

Figure 3:
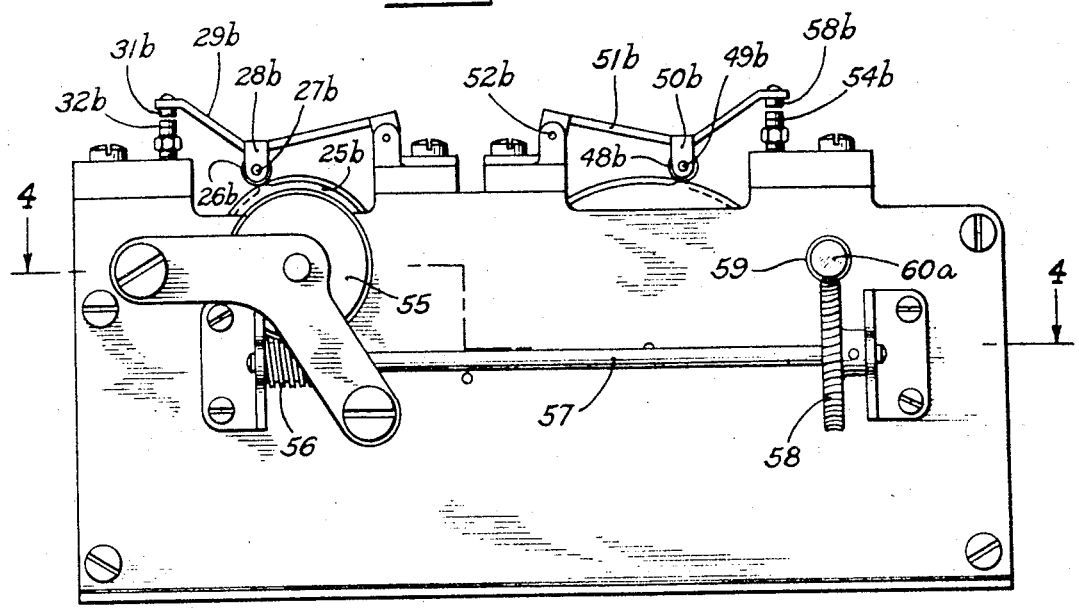
Fig. 3 is a side elevation of the device illustrated in Fig. 2 with certain parts omitted to clarify the operation.

Referring to the drawings and more particularly to Fig. 1, the invention is illustrated, in the present instance, as applied to a water level indicating or recording device, generally known as a water-stage recorder, but it is to be specifically understood that the novel means comprising the invention may be utilized in indicating or recording the measurement of any desired physical quantity. As shown in Fig. 1, a float 10 is mounted for movement by changes in water level and is connected to a chain 11 at one end thereof. The float 10 is raised or lowered in proportion to changes in water level thereby producing movement of chain 11. Chain 11 extends over a sprocket wheel 12, the other depending end thereof having connected thereto a counter weight 13. Sprocket wheel 12 is connected to a shaft 14 carrying gear 15 meshing with pinion 16 whereby said gear and pinion are rotated upon the upward or downward movement of the float 10 in response to changes in water level. Pinion 16 is mounted integral with a shaft 17 carrying a gear 18 meshing with pinion 19 integral with or attached to a shaft 20, at one end thereof. At the other end of shaft 20 there is attached a gear 21 comprising one of the center gears of a spur gear differential mechanism generically designated as 22. Meshing with gear 21 is a spur gear 23 integral with shaft 24 whose ends 24a and 24b are journalled in and attached to the cam surfaced differential housing plates comprising cams 25a and 25b and rotatable with respect thereto. Cam 25a is loosely mounted on shaft 20 for rotation with respect thereto and cooperates with a cam follower 26a journalled at 27a in bracket 28a carried by a switch arm 29a pivoted at 30a at one end thereof and carrying at the other end thereof a contact member 31a which, as indicated in Figs. 1 and 1a, comprises the center contact of a group of three contacts designated as the fine control contacts of the mechanism. Contact 31a cooperates with a stationary contact 32a labelled CW in Figs. 1 and 1a to thereby indicate the contact controlling clockwise rotation of a driving motor whose action will be described in more detail later.

Spur gear 23 meshes with spur gear 33 integral with shaft 34 whose ends 34a and 34b are attached to and journalled in the cams 25a and 25b, respectively, for rotation with respect thereto. Spur gear 33 meshes with gear 35 comprising the other center gear of the spur gear differential mechanism 22.

Spur gear 36 meshing with gear 35 has another spur gear (not shown) meshing therewith, gear 35 and its companion gear being mounted and operating in the same manner as the pair of spur gears 23 and 33.

Center gear 35 is integral with shaft 37 upon which is loosely mounted the cam 25b for rotation with respect thereto, cam 25b cooperating with the cam follower 26b journalled at 27b in bracket 28b carried by switch arm 29b pivoted at 30b at one end thereof and carrying at the other end thereof a contact 31b cooperating with a stationary contact 32b of an electrical circuit whose control will be described in detail later. It is to be noted that contact 32b comprises the counter-clockwise control contact of the group of contacts designated as the fine control contacts of the mechanism.

Gear 38 is attached to the cam 25b by means of a tubular connection 38a. Meshing with gear 38 is a large gear 39 integral with shaft 40 carrying a pinion 41 meshing with gear 42 integral with shaft 43 carrying pinion 44 meshing with gear 45. Gear 45 has integral therewith a pair of stepped bosses 45a and 45b to which are respectively attached cams 46a and 46b. Gear 45 is mounted for rotation with shaft 47 journalled at 47a and 47b in end plates 48a and 48b, respectively (see Fig. 4). Cam 46a cooperates with cam follower 48a journalled at 49a in bracket 50a carried by a switch arm 51a pivoted at 52a at one end thereof and carrying at its other end a contact 53a comprising the center contact of the coarse group of contacts. Contact 53a cooperates with a stationary contact 54a which comprises the clockwise control contact of the coarse set of contacts, whose operation will be described in detail later.

Cam 46b cooperates with cam follower 48b journalled at 49b in bracket 50b carried by switch arm 51b which is pivoted at 52b at one end thereof and carries at its other end a contact 53b cooperating with a stationary contact 54b, the latter contact comprising the counter-clockwise control contact of the coarse set.

A worm gear 55 to which is attached a pinion 55a is suitably connected to shaft 37, whereby said shaft is rotated with said worm gear under the control of the electrical circuit which will be described in detail later. Pinion 55a meshes with a gear 55b cooperating with an index 55c, the gear and index comprising an example of an indicating mechanism for indicating the value of the physical quantity to be measured, namely, in the present instance, the value of the water level. It is to be specifically understood, however, that the pinion 55a may be geared or attached to the rotor of a self-synchronous transmitting device or other actuating element of a remote indicating or recording device.

Figure 4:
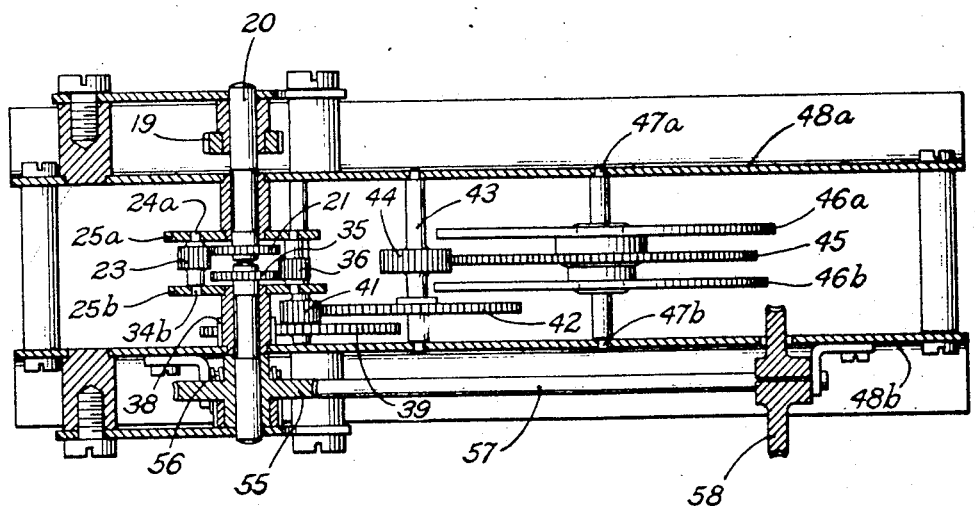
Fig. 4 is a sectional view taken on the line 4—4 of Fig. 3.

Referring to Figs. 2, 3, and 4, worm gear 55 is illustrated as meshing with a worm 56 carried by and attached to a shaft 57 at one end thereof, the other end of said shaft having attached thereto a worm gear 58 meshing with worm 59 mounted on shaft 60a driven by motor 60 (see Fig. 2), the rotation of which is controlled by the cam operated contacts, as illustrated in Figs. 1 and 3 and the electrical circuit as illustrated in Fig. 1a, as will be described in detail later.

Referring to Fig. 1a, there is illustrated the electrical circuit controlled by the storing device shown in Figs. 1, 2, 3, and 4. One set of contacts labelled "Fine" is controlled by the switch arms 29a and 29b as indicated in Fig. 1 while the set of contacts labelled "Coarse" is controlled by the switch arms 51a and 51b as illustrated in Fig. 1. Referring to Figs. 1 and 1a, it is seen from these figures that operation of switch arm 29b to close the contacts 31b and 32b closes a circuit between the fine contacts C and CW as illustrated in Fig. 1a. Operation of switch arm 29b to close the contacts 31b and 32b, on the other hand, closes a circuit between the fine contacts C and CCW of Fig. 1a. The control of the coarse set of contacts is performed in a similar manner by operation of the switch arms 51a and 51b, respectively.

Closure of a circuit between C and CW or C and CCW of the fine contacts operates directly to control the motor 60, in a manner that will be described in detail later. The closure of a circuit between C and CCW or C and CW of the coarse contacts, on the other hand, closes a circuit from one side of a potential source as indicated in Fig. 1a to actuate a solenoid which in turn operates switch elements to control the motor 60 in a manner that will now be described in detail.

Assuming, for example, that the switch arm 51b of Fig. 1 closes the contacts 53b and 54b and referring to the circuits as disclosed in Fig. 1a, the following circuit will be placed in operative condition: From one side of a potential source as indicated in Fig. 1a across contacts C and CCW, line 61, solenoid 62, line 63, back to the other side of the potential source. Energization of solenoid 62 attracts the armature 64 thereof to close a circuit which is traced as follows: From terminal 65 of the motor 60 to line 66, line 67, armature 64, armature contact 64a, line 68, line 69, to terminal 70 on the motor 60. Closure of this circuit short circuits a shading coil (not shown) connected between the terminals 65 and 70 of the motor 60. Upon energization of the armature, the motor is rotated counterclockwise in a manner well known in the art.

On the other hand, closure of the circuit between contacts C and CW of the coarse set of contacts by operation of the switch arm 51a closes a circuit which is traced as follows: From one side of the potential source as indicated in Fig. 1a, to contact C across to contact CW, line 71, solenoid 72, line 73, back to the other side of the source whereby solenoid 72 is energized to attract armature 74 which closes the following circuit: From terminal 65 of the motor 60, line 66, line 75, armature 74, armature contact 74a, line 76, line 77, to terminal 78 of motor 60 whereby a shading coil (not shown) between terminals 78 and 65 is short circuited to produce clockwise rotation of motor 60.

Upon the closure of the circuit between contacts C and CW of the fine set of contacts, however, there is completed the following circuit, it being assumed that the coarse contacts are no longer closed by the switch arms 51a and 51b. The circuit is traced as follows: From the terminal 65 of motor 60, line 66, line 79, armature 80, back contact 80a, line 81, back contact 82a, armature 82, line 83 to contact C, across to contact CW, line 77, to the terminal 78 of the motor 60 whereby the field coil between the terminals 78 and 65 is short circuited to produce clockwise rotation of motor 60.

If either of the pairs of the coarse set of contacts, namely, C and CCW or C and CW is closed, at the time that either of the pairs of contacts C and CCW or C and CW of the fine set of contacts is closed, either solenoid 62 or solenoid 72 is energized and armature 82 or armature 80, respectively, is moved from its respective back contact 82a or 80a so that closure of the fine contacts can not short circuit either of the field coils of motor 60, since the circuit that would ordinarily be closed to produce such a short circuit of one of the field coils is opened by actuation of armature 82 or armature 80. It is seen therefore, that closure of a circuit between C and CCW or between C and CW of the coarse contacts, overrides any attempted control of the motor 60 by means of the fine contacts regardless of whether or not either of the two pairs of contacts of the fine set be closed or opened. The coarse set of contacts, therefore, control the motor until the switch arms 51a and 51b are both moved to open circuit position by their respective cams 46a or 46b whereupon the fine contacts controlled by switch arms 29a and 29b will assume control of motor 60 provided that either of these switch arms is in the circuit closing position. The fine contacts maintain control of the motor 60 until both the switch arms 29a and 29b are moved to open circuit position by the respective cams 25a and 25b.

The operation of the device is as follows:

Let us assume, for example, that there is a power failure, and therefore, the motor 60 is completely deenergized. Changes in the water level measured by float 10 will operate the storing device to store therein an indication proportional to the value of the change in water level. For example, if the water level should drop, float 10 will drop thereby lowering the chain 11 to rotate the sprocket wheel 12 in a counter-clockwise direction as viewed in Fig. 1. Shaft 14 and gear 15 are likewise rotated counter-clockwise to in turn rotate pinion 16, shaft 17, and gear 18 in a clockwise direction. Rotation of gear 18 in a clockwise direction rotates pinion 19, shaft 20 and center gear 21 counter-clockwise. Since motor 60 is de-energized gear 35 is maintained stationary. Rotation of gear 21 in a counter-clockwise direction rotates spur gear 23 clockwise which in turn rotates spur gear 33 counter-clockwise. Since gear 35 is maintained stationary, spur gear 33 "walks around" gear 35 thereby rotating the cam elements 25a and 25b counter-clockwise. If the movement of the float is such a small movement that the cams 25a and 25b are rotated less than a half revolution, fine contacts 31a and 32a will be opened and fine contacts 31b and 32b will be closed. With less than a half revolution of cam 25b, contacts 53a and 54a of the coarse set of contacts and contacts 53b and 54b of the same set will still be maintained in open circuit position. Referring to Fig. 1a, it is seen therefore, that the pairs of contacts C and CCW and C and CW of the coarse set of contacts are all open circuited and that solenoids 62 and 72 are both deenergized. Contacts 31b and 32b having been closed, a circuit is closed between contacts C and CCW of the fine set of contacts whereby one shading coil of the motor 60 is short circuited as described above in detail and motor 60 is thereby prepared for rotation in a counter-clockwise direction when the proper power relationship is resumed. Upon restoration of power therefore, motor 60 will rotate counter-clockwise to rotate worm 59 (see Fig. 2), worm wheel 58, shaft 57, worm 56 (see Fig. 4), and worm wheel 55 to thereby rotate shaft 37 so that gear 35 is rotated in proportion to the rotation of gear 21 by the previous changes in water level. If we assume that the water level is maintained constant during the period that motor 60 is rotated counter-clockwise, gear 35 will be rotated clockwise to rotate spur gear 33 counter-clockwise and spur gear 23 clockwise whereby spur gear 23 will "walk around" gear 21 until cams 25a and 25b are returned to such a position that contacts 31b and 32b are returned to open circuit position, namely, the same position which they had assumed before the stated change in water level. Upon the pairs of contacts 31a, 32a, and 31b, 32b, assuming the open circuit position, rotation of motor 60 will cease and the pointer, or the self-synchronous transmitter or other control mechanism for remote indicating devices controlled by gear 55a will be rotated to a position proportional to the value of the new water level.

If we now assume, however, that the changes in water level are so great that the cams 25a and 25b rotate more than a half revolution or if we now assume that cams 25a and 25b are rotated several complete revolutions, the operation of the device is as follows:

Assuming again an electric power failure, should the water level drop, the float 10 will lower the chain 11 to rotate the sprocket wheel 12 and the gear train connected thereto whereby the cams 25a and 25b are rotated by means of the differential gear connection in a counter-clockwise direction for several revolutions thereof. Such rotation will rotate the cams 46a and 46b so that contacts 53a and 54a will remain open circuited and contacts 53b and 54b will be closed.

Referring to Fig. 1a, assuming that the fine contacts C and CCW are closed, it is seen that the coarse contacts C and CCW are also closed. Closure of the coarse contacts C and CCW energizes solenoid 62 upon restoration of electric current so that the control of motor 60 is taken away from the fine set of contacts and retained by the coarse set as described in detail above. The shading coil of motor 60 between terminals 65 and 70 is thereby short circuited to in turn compel rotation of motor 60, in a counter-clockwise direction. Counter-clockwise rotation of motor 60 (see Fig. 2), will rotate the worm 59, worm wheel 58, shaft 57, worm 56, and worm wheel 55 to in turn rotate the shaft 37 (see Fig. 1), and center gear 35 whereby the differential gear mechanism 22 rotates the cams 25a and 25b several revolutions back towards their original position, to in turn actuate the gear train 38, 39, 41, 42, 44, and 45, whereby the cams 46a and 46b are both returned to such a position that contacts 53a, 54a, and contacts 53b and 54b are in the open circuit position. Ordinarily, at this point the fine contacts 31b and 32b will be in closed position so that the fine set of contacts will take over the control of rotation of motor 60 until cams 25a and 25b are rotated to the position in which contacts 31a, 32a, and contacts 31b, and 32b are all in open circuit position. It is noted that during the rotation of motor 60 to rotate the cams 46a and 46b, the cams 25a and 25b are rotated several revolutions, thereby automatically actuating the respective switch arms 29a and 29b to open and closed circuit positions but it is to be noted, as was described in detail above, that the closure of either pair of contacts 31a and 32a or 31b and 32b does not take over the control of the motor 60 as long as either of the pairs of contacts 53a and 54a or 53b and 54b of the coarse set is in the closed circuit position. The pointer or "Autosyn" or "Selsyn" rotor or other motion repeating mechanism controlled by the gear 55a is thereby rotated to a position indicative of the then value of the water level. It is to be noted that the relative dimensions of the gear train 38, 39, 41, 42, 44, and 45 may be so chosen that the total number of revolutions of the cam elements 25a and 25b which can be stored in the mechanism, may be as high as desired.

Means are therefore supplied whereby the indication of a physical quantity, such as changes in water level, may be stored in a differential mechanism and such stored indication is then utilized to control a follow-up motor whereby a pointer, indicator, or recorder is later actuated to assume a position indicative of the value stored by the differential mechanism.

Although only one embodiment of the invention has been illustrated and described, various changes and modifications in form, materials and relative arrangement of parts, which will now appear to those skilled in the art, may be made without departing from the scope of the invention. Reference is therefore to be had to the appended claims for a definition of the limits of the invention.

What is claimed is:

1. Means for reproducing motion at a remote point comprising, in combination, a controlling movable member and a driven movable object, a motor for driving said driven object, control means for said motor, a differential gear mechanism having one portion thereof mounted for movement with said controlling member, cam means defining fine reproducers of motion mounted for movement with said one portion of said differential gear mechanism for actuating said control means whereby said motor drives said driven object during predetermined minor movements of said controlling member, a second cam means defining coarse reproducers of motion, connecting means between said first-named cam means and said second-named cam means whereby the latter are operated in accordance with the movement of said first-named cam means, said second cam means being adapted to override the control of said motor by said first-named cam means during predetermined major movements of said controlling member and thereafter activating said motor to drive said driven object in proportion to the movement of said controlling member, said motor additionally driving a second portion of said differential gear mechanism whereby said first cam means is moved to its initial position to de-energize said motor.

2. Means for reproducing motion at a remote point comprising, in combination, a controlling movable member and a driven movable object, a motor for driving said driven object, control means for said motor, a differential gear mechanism, cam means formed with said mechanism, said differential gear mechanism having a portion thereof movable with said controlling movable member whereby said cam means are carried therewith for operating said control means energizing said motor thereby driving said driven movable object during predetermined minor movements of said controlling movable member, and means for overriding the controlling action of said cam means during predetermined major movements of said controlling movable member and thereafter energizing said control means to operate said motor, said motor acting to drive said driven object and simultaneously moving said cam means about said differential gear mechanism to its initial position.

3. Means for reproducing motion at a remote point comprising, in combination, a controlling movable member and a driven movable object, a motor for driving said driven object, control means for said motor, a differential gear mechanism having one part thereof rotatable with said controlling movable member, means defining cam surfaces forming with said differential gear mechanism and movable therewith during predetermined minor movement of said controlling member for activating said control means thereby energizing said motor to drive said driven object, means movable with said cam surface defining means for overriding the activating action of the latter means upon said control means during predetermined major movements of said controlling member and thereafter operating said control means for energizing said motor whereby said driven object is moved into positional agreement with said controlling member and said cam surface defining means is simultaneously restored to its initial position.

4. Means for reproducing motion at a remote point comprising, in combination, a controlling movable member and a driven movable object, a motor for driving said driven object, control means for said motor, a differential gear mechanism having one portion thereof mounted for rotatable movement with said controlling member, cam means defining fine reproducers of motion mounted for movement with said differential gear mechanism whereby upon predetermined minor relative movement of said controlling member said cam means operate said control means energizing said motor to drive said driven object in accordance with the amount of said minor relative movement, a gear train movable with said cam means, and second cam means defining coarse reproducers of motion movable with the first-named cam means through said gear train whereby upon predetermined major movements of said controlling member said second cam means overrides the operation of said control means by said first-named cam means and thereafter assumes operation of said control means energizing said motor to thereby drive said driven object in accordance with the relative major movement of said controlling member through said gear train and simultaneously rotate another portion of said differential mechanism whereby said first-named cam means resumes its initial position.

RALPH R. CHAPPELL.
RUTGER B. COLT.